United States Patent [19]
Higuchi et al.

[11] Patent Number: 5,239,222
[45] Date of Patent: Aug. 24, 1993

[54] ELECTROSTATIC ACTUATOR USING FILMS

[75] Inventors: Toshiro Higuchi, 2-5-50509, Fujigaoka, Midori-ku, Yokohama-shi, Kanagawa; Saku Egawa, Tokyo, both of Japan

[73] Assignees: Fujitsu Limited, Kawasaki; Toshiro Higuchi, Yokohama, both of Japan

[21] Appl. No.: 582,211

[22] PCT Filed: Mar. 9, 1990

[86] PCT No.: PCT/JP90/00312
§ 371 Date: Oct. 2, 1990
§ 102(e) Date: Oct. 2, 1990

[30] Foreign Application Priority Data

Apr. 24, 1989 [JP] Japan ................... 1-101797

[51] Int. Cl.$^5$ .................. H02N 1/00; H02K 41/00
[52] U.S. Cl. ............................ 310/309; 310/12
[58] Field of Search ............... 310/309, 12, 13, 15, 310/19; 318/135, 116

[56] References Cited

U.S. PATENT DOCUMENTS

| | | | |
|---|---|---|---|
| 4,230,978 | 10/1980 | Gardella, Jr. et al. | 318/135 |
| 4,754,185 | 6/1988 | Gabriel et al. | 310/309 |
| 4,814,657 | 3/1989 | Yano et al. | 310/309 |
| 4,894,569 | 1/1990 | Lardiere, Jr. et al. | 318/116 |
| 5,015,906 | 5/1991 | Cho et al. | 310/309 |
| 5,043,043 | 8/1991 | Howe et al. | 310/309 |

FOREIGN PATENT DOCUMENTS 63-95862 4/1988 Japan .
63-95865 4/1988 Japan .

OTHER PUBLICATIONS

Philips Technical Review, vol. 30, 1969, No. 6/7, "Electrostatic Motors", B. Bollee, pp. 178-194.
Proc., IEEE Micro Electro Mechanical Systems Workshop, Napa Valley, CA, Feb. 11-14, 1990, "Multi-Layered Electrostatic Film Actuator", Saku Egawa et al., pp. 166-171.

Primary Examiner—Steven L. Stephan
Assistant Examiner—Ed To
Attorney, Agent, or Firm—Staas & Halsey

[57] ABSTRACT

An electrostatic actuator using films providing a large force with a small and simple structure comprising a stator (1) providing a plurality of belt type electrodes wired in the insulation material, a migrator (10) placed on the stator (1) and composed of an insulation material layer film (11) and a resistance material layer film (12) and a means for floating, driving and positioning the migrator (10) by changing voltages to be applied to the belt type electrodes (4).

21 Claims, 7 Drawing Sheets

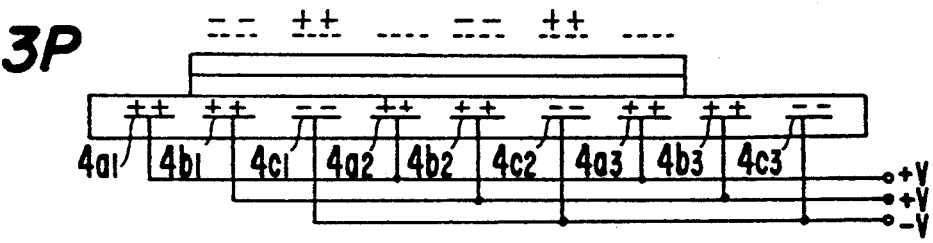

ELECTROSTATIC ACTUATOR USING FILMS

FIELD OF THE INVENTION

The present invention relates to an electrostatic actuator using ultra thin film.

BACKGROUND OF THE INVENTION

An electrostatic generator has been proposed as a means for converting mechanical energy into electric field energy, while an electrostatic motor is known as a means for converting electric field energy into mechanical energy.

Such electrostatic motor has a long history and investigations have already been started from 19th century. For example, it is described in detail in the "HANDBOOK OF STATIC ELECTRICITY", P664 P675, written by Academic Circles of Static Electricity, published by OHM PUBLICATION CO.

This paper refers to an induction motor utilizing delayed polarization of dielectric material.

This induction motor is based on the principle that a dielectric material placed under the electric field is poralized and such delayed poralization is used.

Namely, as shown in FIG. 8, in case an inductor b as a rotor is placed within the rotary field within a stator a, an induced load of dielectric material b is deviated in angle from the rotary field due to time delay. A mutual effect between charge and rotary field becomes a rotating force.

Moreover, a motor using a resistance material in place of dielectric material is also proposed. This motor utilizes charges induced within the resistance material under the rotary field are delayed to control direction of field.

However, a conventional electrostatic motor has following problems.

(1) An induction motor described above cannot utilize films because an absorbing force is generated between a resistance material and electrodes.

(2) This motor is formed by a rotary mechanism providing a certain gap between stator and rotor. A mechanism such as bearing is used to hold such gap. Therefore, it is difficult to form narrow gap for a wider area. Moreover, realization of narrow gap will require sufficiently thick stator and rotor to obtain high rigidity and thereby a force density (force generated in the unit area) may be deteriorated.

Accordingly, it is difficult to form a compact induction motor and it has only a low force density.

SUMMARY OF THE INVENTION

Considering such problems of the prior art, it is therefore an object of the present invention to provide an electrostatic actuator using a film which generates an electrostatic force between solid surfaces, has a narrow gap and increases the surface area to obtain a larger force density.

The object of the present invention described above can be attained by an electrostatic actuator using a film comprising a stator having a plurality of belt type electrodes wired in an insulator, a migrator placed on this stator and is formed by an insulation material film and resistance material film and a means for floating and driving the migrator and conducting positioning by changing a voltage to be applied to the belt type electrodes; or an electrostatic actuator comprising a base to be fixed, a stator extended from the base and having a plurality of belt type electrodes wired in an insulator, a migrator having a plurality of films with the open end side placed on the films and the other end coupled with the base and a means for floating and driving the migrator and conducting positioning by changing a voltage to be applied to the belt type electrodes; or an electrostatic actuator using films comprising a stator having a plurality of concentric belt type electrodes wired in the insulation material, a migrator placed on the stator and formed by insulation material film and resistance material film and a means for floating the migrator and giving a radial tension to the migrator by changing a voltage to be applied to the belt type electrodes.

According to the present invention, as shown in FIG. 1 and FIG. 2, the lower stator 1 is formed by burying belt type electrodes 4 in the insulation material 2. Meanwhile, the migrator 10 is formed by the insulation material layer film 11 and resistance material layer film 12 and is placed in contact on the stator 1. As explained later, a voltage is selectively applied to the belt type electrodes 4 to charge (induce the charges in) the resistance material layer. Thereafter, as explained later, the migrator 10 is floated and moved pitch by pitch by changing a voltage to be applied.

The migrator 10 of this actuator does not have an electrode. Since a pattern of belt type electrodes 4 of stator 1 is transferred to the migrator 10 by the charging operation, positioning of migrator 10 for the stator 1 is unnecessary and high precision machining of the belt type electrodes 4 is not required.

In addition, this actuator keeps a gap through contact of stator 1 and migrator 10 and therefore ensures the gap as narrow as possible. In this case, friction between them must be considered, but such friction is eliminated by floating the migrator 10 with electrostatic force.

A sensor or complicated control is required for always floating the migrator 10, but in the case of the present invention, it is tentatively floated only when the migrator 10 is driven. Therefore, sensor or complicated control is unnecessary.

As explained above, an electrostatic actuator of the type described here has simple structure and is not required to have high maching accuracy and does not require complicated controls. Therefore, it can be manufactured easily and both stator and migrator can also be formed easily using films.

In addition, since physical occupation required for the part not essential in the point of generating electrostatic force such as the gap holding mechanism and control circuit can be reduced as much as possible, a force density of the actuator as a whole can be increased.

Particularly when the migrator and stator are formed using films, thickness becomes extremely smaller for the area and therefore useless space can be eliminated and force density may be increased.

As a film material, a desired one can be selected from a variety of types of polymer films. These polymer films are excellent insulation materials and is resistive to high electric field. Accordingly, the polymers are suitable as the material of electrostatic actuator.

The actuators using film type migrator and stator may be stacked in many layers through connection as shown in FIG. 5. Since the holding mechanism for stacking is not required, the force density as a whole becomes almost equal to the force density of each layer.

Accordingly, an actuator as a whole is capable of providing a large force density and showing an intensive force. Such actuator has a structure similar to the muscle of a living body and therefore can be called a kind of electrostatic artificial muscle.

In case such actuators are stacked, a large amount of films having fine conductor patterns are necessary but such films can be manufactured easily and economically by the printing technique.

DESCRIPTION OF THE PREFERRED EMBODIMENTS

An embodiment of the present invention will be explained in detail with reference to the accompanying drawings.

Figure 1:
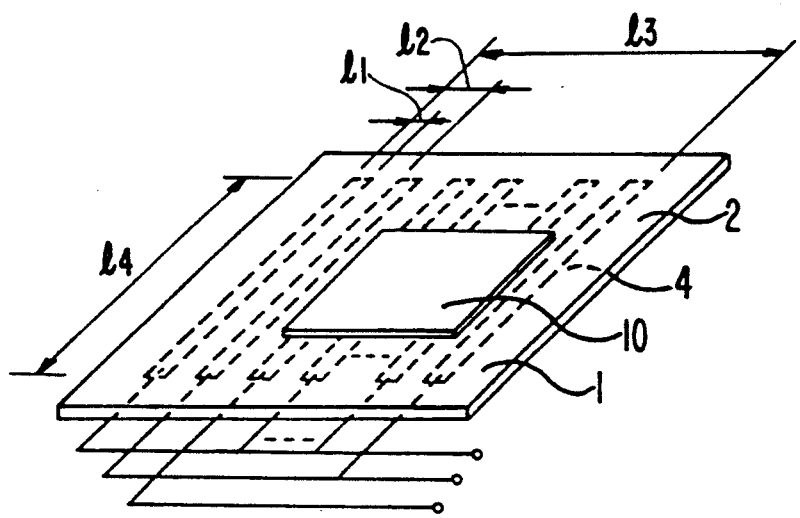
FIG. 1 is a perspective view of an electrostatic actuator using films indicating an embodiment of the present invention.
Figure 2:
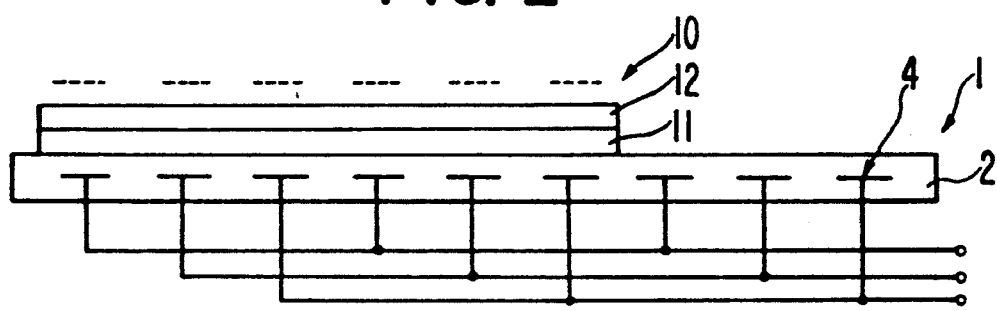
FIG. 2 is a structural diagram of an electrostatic actuator.

FIG. 1 is a perspective view of electrostatic actuator using films indicating an embodiment of the present invention and FIG. 2 is a structural diagram of electrostatic actuator.

As shown in these figures, a lower stator 1 is formed by burying belt type electrodes 4 in an insulation material 2.

In more detail, the stator 1 is formed by a base layer consisting of an insulation material film, belt type electrodes 4 wired on this base layer and an insulation layer film formed thereon.

A migrator 10 is formed by an insulation material layer 11 and a high resistance material layer 12 and it is then placed in contact on the stator 1.

As explained later, a voltage is selectively applied to the belt type electrodes 4 to drive the migrator 10 for positioning.

For instance, width $l_1$ of belt type electrode 4 is 0.4 mm, pitch $l_2$ of belt type electrode 4 is 1.27 mm, a total width $l_3$ of the belt type electrodes 4 is 126 mm, length of belt type electrode 4 is 175 mm.

Next, operations of this electrostatic actuator will be explained with reference to FIGS. 3(A)-3(T).

Figure 3A:
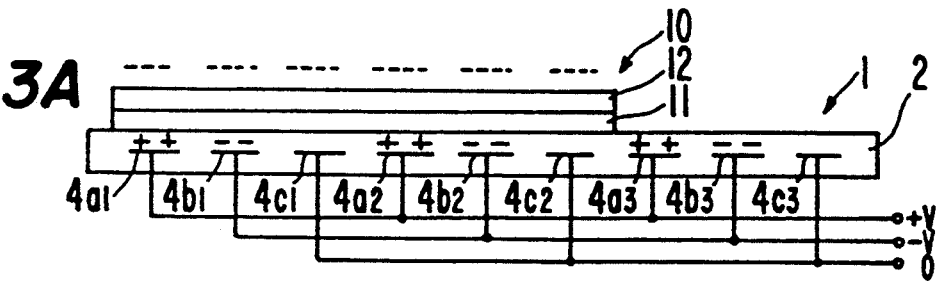
FIGS. 3(A)-3(T) are diagrams for explaining operations of electrostatic actuator.

First, as shown in FIG. 3(A), a positive voltage $+V$ is applied to the first electrode group $4_{a1}$, $4_{a2}$, $4_{a3}$ buried in the insulation material 2 forming the stator 1, a negative voltage $-V$ to the second electrode group $4_{b1}$, $4_{b2}$, $4_{b3}$ and 0V to the third electrode group $4_{c1}$, $4_{c2}$, $4_{c3}$.

Thereby, a current flows into a high resistance material layer 12 in which any charge does not exist initially, resulting in the equilibrium condition where charges are induced at the boundary between the high resistance material layer 12 and the insulation material layer 11. These charges may be replaced by mirror image charge at the position indicated by a dotted line in FIG. 3(B).

Under this condition, the migrator 10 is being attracted by the stator 1.

Figure 3B:
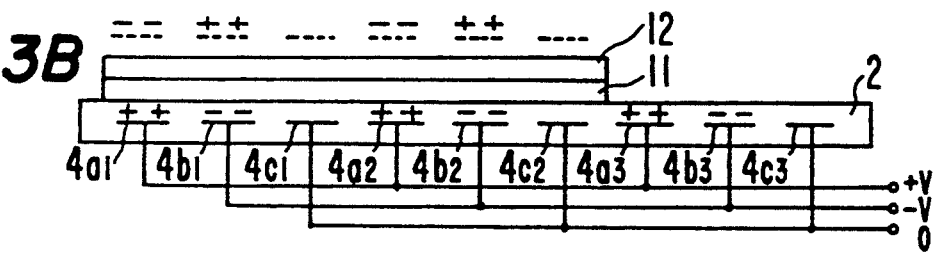
Figure 3C:
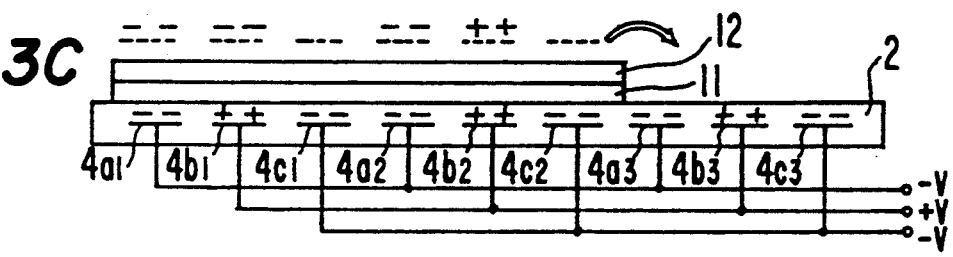

Next, as shown in FIG. 3(C), a voltage to be applied to the electrodes is changed.

Namely, a negative voltage $-V$ is applied to the first electrode group $4_{a1}$, $4_{a2}$, $4_{a3}$, a positive voltage $+V$ to the second electrode group $4_{b1}$, $4_{b2}$, $4_{b3}$ and a negative voltage $-V$ to the third electrode group $4_{c1}$, $4_{c2}$, $4_{c3}$, respectively.

The charges in the electrodes momentarily move but mirror charges induced in the high resistance material layer 12 cannot move immediately due to a high resistance.

The charges in the electrodes $4_{a1}$, $4_{b1}$, $4_{a2}$, $4_{b2}$ are same as the mirror charges thereon in the polarity and a repulsion force is generated and thereby the migrator 10 is floated by such repulsion force.

Moreover, the negative charges of electrode $4_{c1}$ and the positive charges of mirror image of electrode $4_{b1}$ are absorbed with each other and the negative charges of electrode $4_{c1}$ and the negative charges of mirror image on the electrode $4_{a2}$ repulse with each other. Thereby, the migrator receives a driving force to the right side and moves to the right side.

Figure 3D:
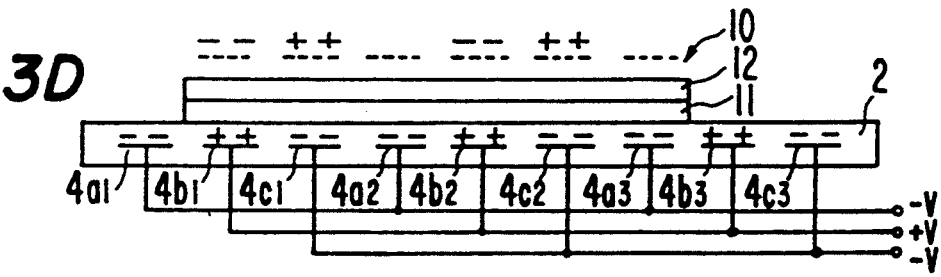

Therefore, when the migrator 10 moves to the right by one pitch, as shown in FIG. 3(D), charges of electrode is different in polarity from the charges of mirror image thereon. Thereby an attracting force is generated and the migrator 10 stops there.

Figure 3E:
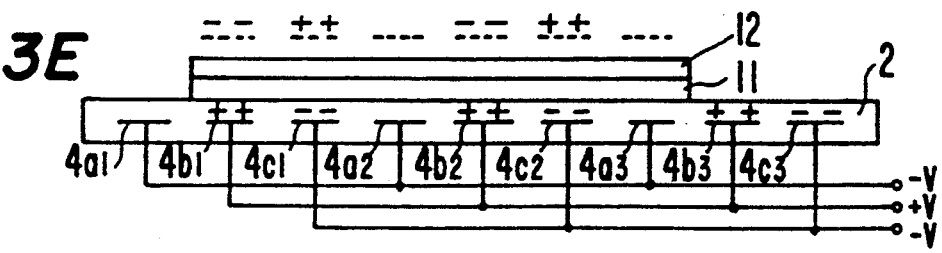

Next, as shown in FIG. 3(E), 0V is applied to the first electrode group $4_{a1}$, $4_{a2}$, $4_{a3}$, a positive voltage $+V$ to the second electrode group $4_{b1}$, $4_{b2}$, $4_{b3}$ and a negative voltage $-V$ to the third electrode group $4_{c1}$, $4_{c2}$, $4_{c3}$, respectively.

Thereby, while the migrator 10 moves, the charges of mirror image are diverged and thereby mirror image charges are induced (charged).

Figure 3F:
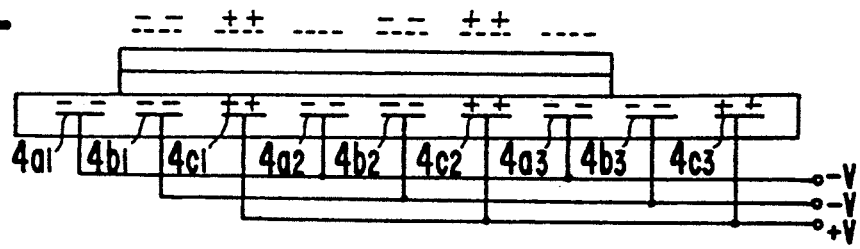

Next, as shown in FIG. 3(F), a negative voltage $-V$ is applied to the first electrode group $4_{a1}$, $4_{a2}$, $4_{a3}$, a negative voltage $-V$ to the second electrode group $4_{b1}$, $4_{b2}$, $4_{b3}$ and a positive voltage $+V$ to the third electrode group $4_{c1}$, $4_{c2}$, $4_{c3}$, respectively.

Figure 3G:
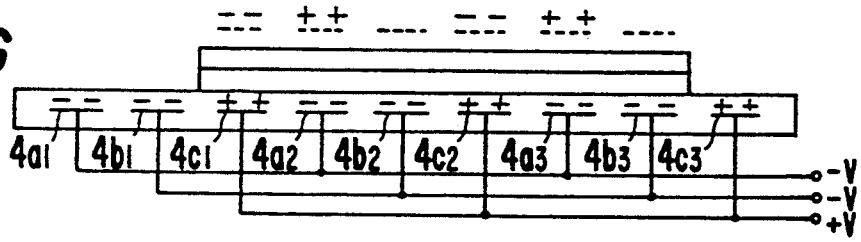

Thereby, as explained in FIG. 3(C), the charges of electrode become equal in the polarity to the mirror image charges, the migrator 10 is driven to the right by a repulsion force, as shown in FIG. 3(G), it is then positioned to the opposed area where the charges of electrode are in the different polarity from the mirror image charges, namely to the position shifted by one pitch from the initial position.

Figure 3H:
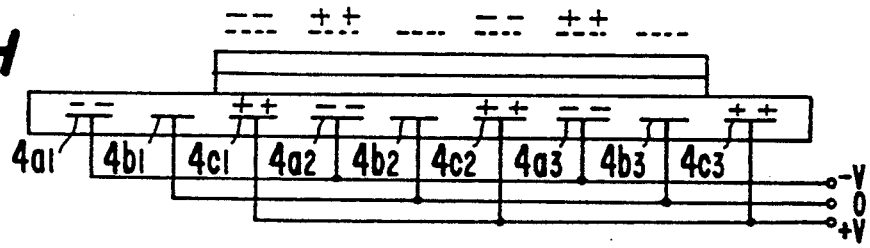

Next, as shown in FIG. 3(H), when the second electrode group $4_{b1}$, $4_{b2}$, $4_{b3}$ is set to 0V from the condition of FIG. 3(G), the charges on the electrodes $4_{b1}$, $4_{b2}$, $4_{b3}$ become 0.

Figure 3I:
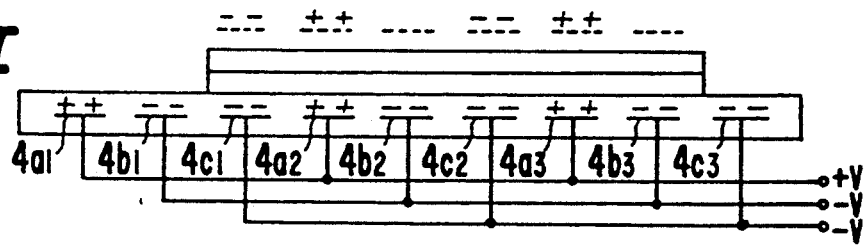

Thereafter, as shown in FIG. 3(I), a positive voltage $+V$ is applied to the first electrode group $4_{a1}$, $4_{a2}$, $4_{a3}$, a negative voltage $-V$ to the second electrode group $4_{b1}$, $4_{b2}$, $4_{b3}$ and a negative voltage $-V$ to the third electrode group $4_{c1}$, $4_{c2}$, $4_{c3}$, respectively.

Figure 3J:
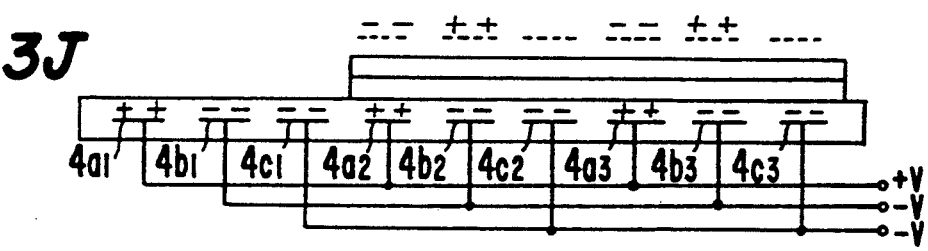
Figure 3K:
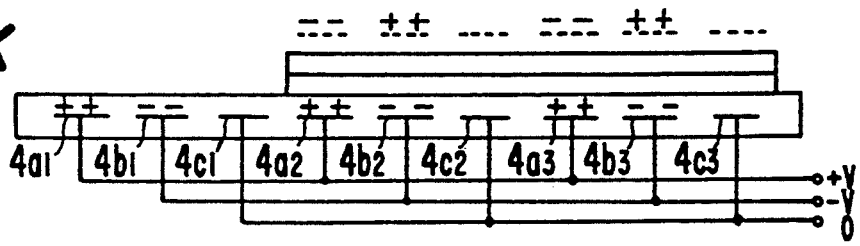

Thereby, as explained in FIG. 3(C), the migrator 10 is floated by a repulsion force and is driven to the right. As shown in FIG. 3(J), the migrator 10 is positioned to the opposed position where the charges of electrode are different in polarity from the mirror image charges, namely to the position shifted by one pitch from the initial position., Next, as shown in FIG. 3(K), the electrodes $4_{c1}$, $4_{c2}$, $4_{c3}$ of the third electrode group are set to 0V from the condition of FIG. 3(J), the charges of these electrodes become 0.

Figure 3L:
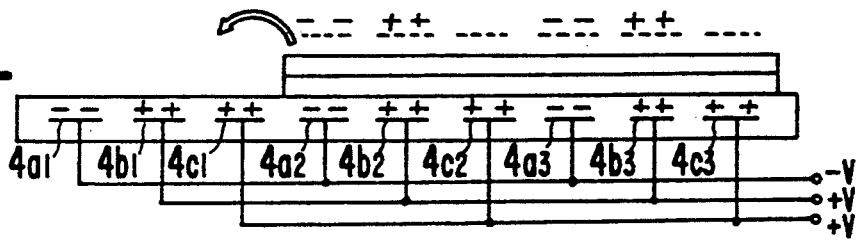

Next, as shown in FIG. 3(L), a negative voltage $-V$ is applied to the first electrode group $4_{a1}$, $4_{a2}$, $4_{a3}$, a positive voltage $+V$ to the second electrode group $4_{b1}$, $4_{b2}$, $4_{b3}$, and a positive voltage $+V$ to the third electrode group $4_{c1}$, $4_{c2}$, $4_{c3}$, respectively.

Thereby, the migrator 10 can be moved in the reverse direction by the same method.

Figure 3M:
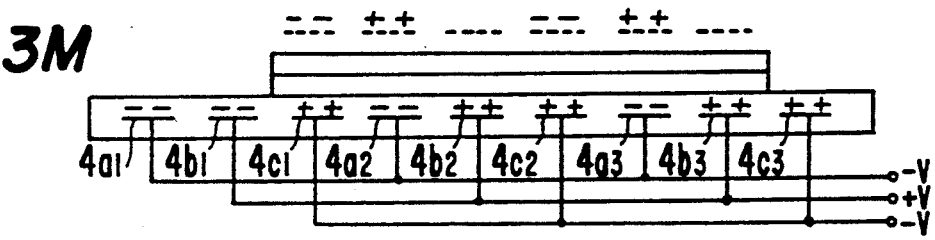
Figure 3N:
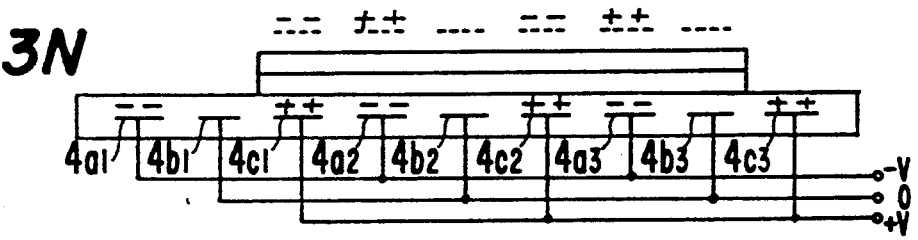
Figure 3O:
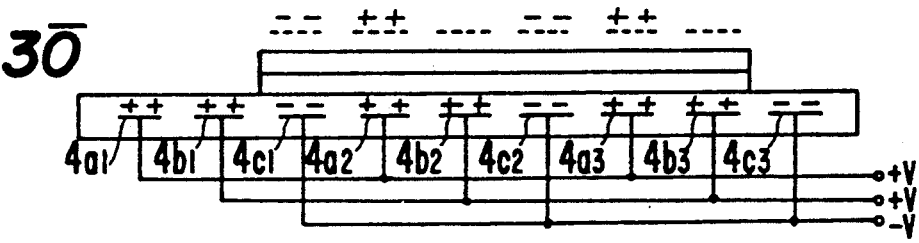

Namely, the charges of electrodes are in the same polarity to the mirror image charges, the migrator 10 is floated and driven to the left by a repulsion force. Thereby, as shown in FIG. 3(M), the migrator 10 is positioned to the position where the charges of electrodes are in the different polarity from the mirror image charges, namely to the position shifted by one pitch from the initial position.

Here, if the migrator 10 attempts to move to the right side, since the negative charges of the third electrode $4_{c1}$ repulses to the negative charges of mirror image on the first electrode $4_{a2}$, the migrator 10 cannot move to the right side.

Hereunder, as shown in FIGS. 3(N) to 3(T), the migrator 10 moves sequentially to the left pitch by pitch and is finally positioned.

Figure 6:
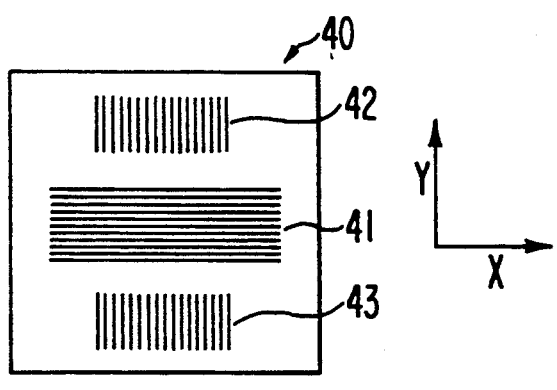
FIG. 6 is a plan view of stator of an electrostatic actuator using films indicating the third embodiment of the present invention.
Figure 7:
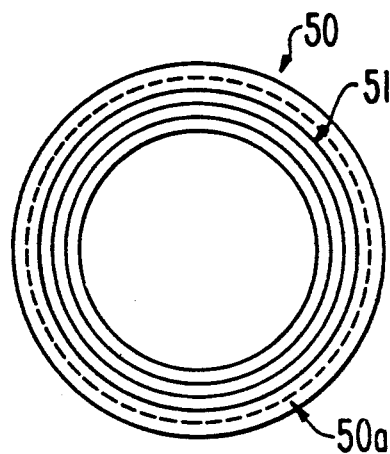
FIG. 7 is a plan view of stator of an electrostatic actuator using films indicating the fourth embodiment of the present invention.
Figure 8A:
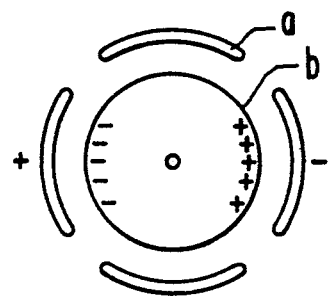
FIG. 8 is a diagram indicating outline of structure of an conventional electrostatic actuator.
Figure 8B:
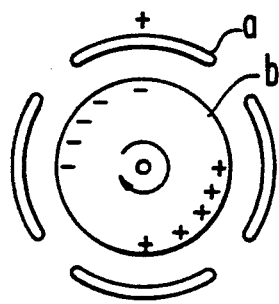

The electrodes provided to the stator in above explanation are arranged only in the one direction but these may also be arranged in various methods, for example, as shown in FIG. 6 and FIG. 7 (described later).

Moreover, size, pitch and number of steps of stator and migrator can be selected as desired.

Figure 4:
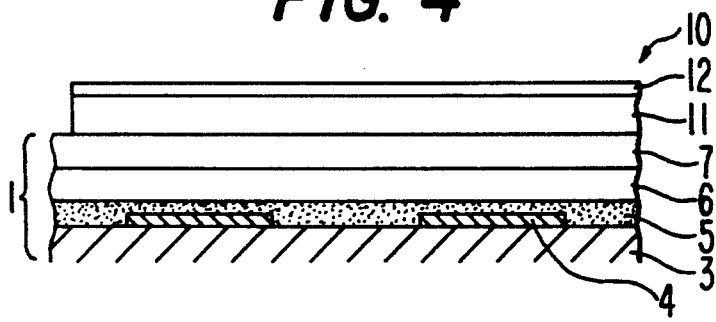
FIG. 4 is a partial sectional view of an electrostatic actuator.

Here, an example of practical structure of an electrostatic actuator using films will be explained with reference to FIG. 4.

As shown in this figure, the stator 1 forms 100 belt type electrodes 4 with an interval of 1.27 mm on a glass epoxy substrate 3 by the etching process and these electrodes are covered with epoxy resin 5 and two sheets of insulation materials 2 consisting of PET (Poly Ethylene Telephthalate) films 6, 7 in the thickness of 0.1 mm.

As the insulation material layer 11 of migrator 10, a PET film in the thickness of 0.1 mm is used. The surface is then coated with an anti-charging agent which is used as a high resistance material layer 12.

A voltage of $V=1$ (kV) is applied by the method explained above. The first trial of charging (time required for inducing the mirror image charges) requires about 10 seconds. The time for second trial can be reduced to only a second since the charges of the first trial may be used.

Thereafter, an actuator stacking the electrostatic actuators using films described above will be explained.

Figure 5:
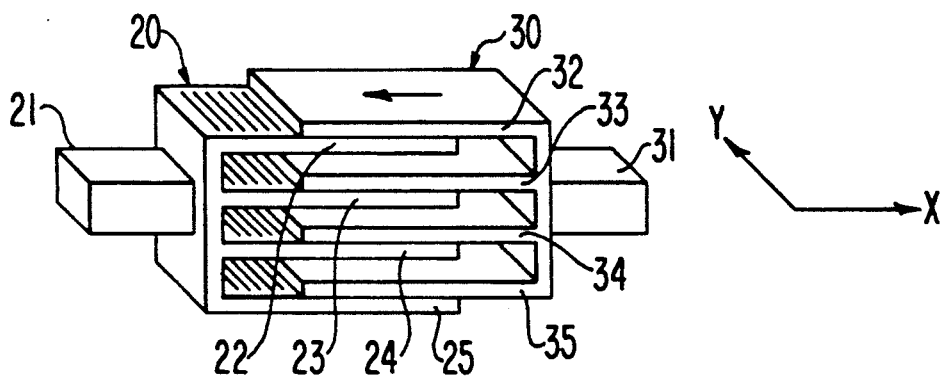
FIG. 5 is a perspective view of an electrostatic actuator using films indicating the second embodiment of the present invention.

FIG. 5 is a perspective view of such actuator. The stator 20 comprises the fixed base 21 and a plurality of films 22-25 which are extended from the base 21 and form the belt type electrodes in the direction Y axis. On these films 22-25, a plurality of films 32-35 coupled at the base 31 forming the migrator 30 are placed.

Here, the migrator 30 can be moved in the direction of X axis by applying voltages in such a manner as shown in FIG. 3(B) to FIG. 3(D), for example, to the belt type electrodes provided on the films 22-25 of the stator 20.

A structure in which the entire part contracts linearly and the bundled films are arranged interdigitally resembles fiber of muscle and it may be called an artificial muscle because a force changes in proportional to a sectional area and a power also changes in proportional to a volume.

Moreover, it is also possible to form the belt-shaped electrodes connected in the directions of X axis and Y axis to the stator. For instance, as shown in FIG. 6, the migrator placed can be driven in the direction of X axis and/or of Y axis by providing the belt type electrode 41 wired in the direction of X axis and the belt type electrodes 42, 43 wired in the direction of Y axis on the stator 40 and changing the voltages of each electrode.

Furthermore, as shown in FIG. 7, the stator 50 is formed like a disk and ring type belt type electrode 51 is concentrically provided. For example, a wrinkled disk film (migrator), 50a is placed on the stator 50 and a voltage to drive in the radial direction the film is supplied to the belt type electrode 51. Thereby, the wrinkle of the disk type film can be eliminated.

While the invention has been particularly shown and described with reference to the preferred embodiments thereof, it will be understood by those skilled in the art that the foregoing and other changes in form and details may be made therein without departing from the spirit and scope of the invention.

According to the present invention, it provides following effects.

(1) The migrator is floated when a voltage is applied and it can be driven pitch by pitch by changing a voltage applied to the belt type electrode.

(2) Since the migrator of this actuator does not have electrode and a pattern of belt type electrode of stator is transferred by the charging operation, positioning of migrator for the stator is unnecessary and high precision machining of belt type electrode is not required.

(3) In this actuator, a gap is held by contact of stator and migrator and therefore this gap can be set as small as possible.

In this case, friction between them is considered as a problem, but friction can be eliminated by floating the migrator using electrostatic force. In this case, the migrator is tentatively floated only for the driving and sensor or other complicated control are unnecessary.

(4) Since this actuator has a simplified structure, does not require high accuracy of elements and complicated control, it can be manufactured easily and both stator and migrator can also be formed using films. Moreover, since the volume for the part such as the gap holding mechanism and control circuit not essential for generating electrostatic force can be reduced as much as possible, the force density of the actuator as a whole can be increased.

Particularly, when the migrator and stator are formed using films, thickness becomes very small for the area and thereby useless space can be eliminated and force density can be increases.

(5) Stacking can be made while keeping the force density and thereby a forcible actuator can be formed.

(6) Fine conductor pattern wiring on the substrate can be made easily, widely and economically by the current printing technique.

What is claimed is:

1. An electrostatic actuator comprising:
   a stator including an insulation material and an plurality of belt type electrodes formed in said insulation material;

an electrodeless migrator placed on said stator and including an insulation material layer film and a resistance material layer film; and means for applying a negative voltage and a positive voltage to said belt type electrodes, said applying means switchingly applying the voltage to said belt type electrodes in the following order to move said electrodeless migrator, applying a negative voltage to a first electrode in said stator and a positive voltage to a second electrode in said stator, adjacent said first electrode, to form an electric charge pattern on said electrodeless migrator in accordance with positions of said first and second electrodes, switching the polarity of the voltages applied to said electrodes, respectively, for generating a floating force to said electrodeless migrator and an electric charge on said electrodes, and for supplying a voltage having a polarity opposite the polarity of the voltage on one of said electrodes adjacent to said electrode with respect to a desired moving direction of said electrodeless migrator for moving said electrodeless migrator by an attractive force between the electric charge on said electrodeless migrator and an electric charge on said electrode adjacent to said electrode with respect to a desired moving direction of said electrodeless migrator.

2. An electrostatic actuator using films according to claim 1, wherein said stator comprises a base layer including said insulation material, said belt type electrodes formed on said base layer and another insulation material layer film formed on said belt type electrodes and said base layer.

3. An electrostatic actuator using films according to claim 1, wherein said stator comprises:
a glass epoxy substrate;
said belt type electrodes formed on said glass epoxy substrate;
said insulation material includes an epoxy resin coated on said belt type electrodes and said glass epoxy substrate; and
a film stacked on said epoxy resin.

4. An electrostatic actuator using films according to claim 1, wherein said resistance material layer comprises an anti-charging agent.

5. An electrostatic actuator using films according to claim 3, wherein said film comprises a polymer film.

6. An electrostatic actuator using films according to claim 5, wherein said polymer film comprises polyethylene telephthalate.

7. An electrostatic actuator according to claim 1, further comprising:
a first base having said stator mounted thereon;
another stator including a plurality of stacked insulation material layers and an additional plurality of belt type electrodes formed in one of said plurality of stacked insulation material layers mounted on said first base;
a second base having said electrodeless migrator mounted thereon; and
another electrodeless migrator placed on said another stator and including another insulation material layer film and another resistance material layer film and being mounted on said second base.

8. An electrostatic actuator according to claim 1, wherein said belt type electrodes comprise:
a plurality of concentric belt type electrodes.

9. An electrostatic actuator according to claim 4, wherein said resistance material layer comprises a polymer film.

10. An electrostatic actuator according to claim 9, wherein said polymer film comprises polyethylene telephthalate.

11. An electrostatic actuator according to claim 1, wherein said plurality of belt type electrodes comprise a first plurality of belt type electrodes arranged in the first direction, and a second plurality of belt type electrodes arranged in a second direction being at an angle to said first direction.

12. An electrostatic actuator, comprising:
a stator including an insulation material and a plurality of belt type electrodes formed in said insulating material;
an electrodeless migrator placed on said stator and including a resistance material layer film; and
means for applying a negative voltage, a positive voltage, and a zero voltage to said belt type electrodes, said means for applying a negative voltage, a positive voltage and a zero voltage to said belt type electrodes includes switchingly applying the voltages to said belt type electrodes in the following order to move said electrodeless migrator, including applying a negative voltage to a first electrode in said stator and a positive voltage to a second electrode in said stator and switching the polarity applied to said first and second electrodes, respectively.

13. An electrostatic actuator according to claim 12, wherein said stator comprises a base layer including said insulation material, said belt type electrodes formed on said base layer and a second insulation material formed on said belt type electrodes and said base layer.

14. An electrostatic actuator using films according to claim 12, wherein said stator comprises:
a glass epoxy substrate;
said belt type electrodes formed on said glass epoxy substrate;
said insulation material including epoxy resin coated on said belt type electrodes and said glass epoxy substrate; and
a film stacked on said epoxy resin.

15. An electrostatic actuator according to claim 12, wherein said resistance material layer comprises an anti-charging agent.

16. An electrostatic actuator according to claim 15, wherein said film comprises a polymer film.

17. An electrostatic actuator according to claim 16, wherein said polymer film comprises polyethylene telephthalate.

18. An electrostatic actuator according to claim 12, further comprising:
a first base having said stator mounted thereon;
another stator including a plurality of stacked insulation material layers and an additional plurality of belt type electrodes formed in one of said plurality of stacked insulation material layers mounted on said first base;
a second base having said electrodeless migrator mounted thereon; and
another electrodeless migrator placed on said another stator and including another insulation material layer film and another resistance material layer film and being mounted on said second base.

19. An electrostatic actuator according to claim 12, wherein said belt type electrodes comprise:
a plurality of concentric belt type electrodes.

20. An electrostatic actuator according to claim 14, wherein said resistance material layer comprises a polymer film.

21. An electrostatic actuator according to claim 20, wherein said polymer film comprises polyethylene telephthalate.

* * * * *